May 25, 1926.
J. SENFT
1,586,387
REVOLVING LINK CROSS CHAIN
Filed Sept. 26, 1922
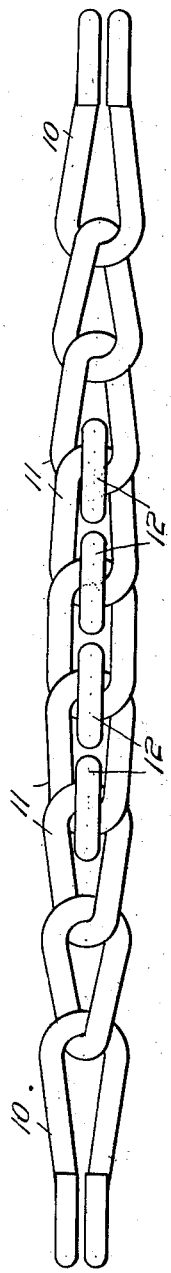
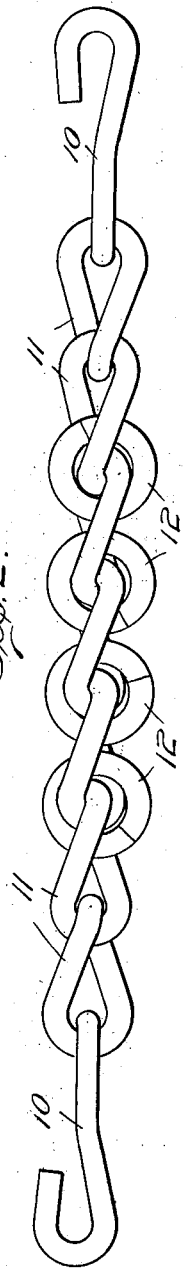
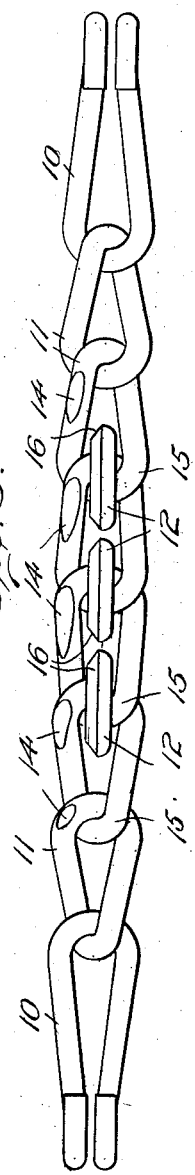
Inventor
John Senft
By Church & Church
His Attorneys Patented May 25, 1926.

1,586,387

UNITED STATES PATENT OFFICE.

JOHN SENFT, OF YORK, PENNSYLVANIA, ASSIGNOR TO UNITED STATES CHAIN AND FORGING COMPANY, OF PITTSBURGH, PENNSYLVANIA, A CORPORATION OF PENNSYLVANIA.

REVOLVING-LINK CROSS CHAIN.

Application filed September 26, 1922. Serial No. 590,627.

This invention relates to cross chains for automobile anti-skid or traction chain devices and particularly to reinforced cross chains.

The object of the present invention is to provide a reinforced cross chain of increased life and yielding additional traction. A further object of the invention is the provision of a reinforcing, whereby the cross chain may be reversed not only end for end, but which may be turned upside down on the tire and later again reversed end for end, thus distributing the wear on four distinct sides of the link.

A further object of the invention is the provision of reinforcing members wherein each member connects a plurality of links so that if certain of the links of the cross chain should break or become worn out the reinforcing member would then serve as a chain link and prevent separation of the broken ends of the chain.

A further and valuable advantage of the present invention lies in the provision of high carbon steel reinforcing members. It is the common practice in making cross chains to form the links of the cross chain of a relatively low carbon steel in order that they may be electrically welded. These links usually of the curb type can be case hardened, but cannot be tempered, whereas, the reinforcing members not being welded may be made of such a high carbon steel as to take a fine temper and therefore acquire a very high degree of hardness.

In the drawings:—

Figure 1 represents a plan view of a reinforced cross chain made in accordance with the present invention.

Fig. 2 is a side elevation.

Fig. 3 is a top view of a cross chain that has been worn by use but has not been turned or reversed so that all of the wear is shown on one of the four corners of the curb chain and at one side only of the reinforcing links.

In the drawings, the hooks or connecting members 10 and the curb links 11 are of the usual type, the hooks 10 being secured to the side chains (not shown) which are of such length as to form a circle slightly less in diameter than the greatest diameter of the inflated tire in order to prevent skidding. The links 11 are preferably curbed and for cheapness of manufacture are electrically welded.

Due to the necessity of using steel of such low carbon content as to be conveniently electrically welded it becomes quite difficult and expensive to give these links sufficient hardness to withstand the heavy duty imposed upon them in connection with city traffic or with the macadamized roads of highway importance. It would be possible to make the cross chains of high carbon steel without welding the links but in practice this presents disadvantages which more than compensate for the additional hardness and it has therefore been deemed requisite and necessary that the two connecting members 10 must be joined by a complete series of welded links.

The reinforcing members 12 are here shown as rings, each embracing the proximate ends of each two curb links. It is obvious that these links may be of other shape than circular and that they need not necessarily be secured at the ends of the curb links.

In their preferred structure, the rings 12 are made in any desired manner as for example by winding a wire in the form of a helix of appropriate diameter and slitting the helix; the method of forming the individual rings however being quite immaterial as regards the present invention. The rings are preferably not welded, it being my desire to make these rings of high carbon steel so that they will be of much greater hardness than the case hardened electrically welded curb links. As shown in the various figures the rings 12 are free to revolve or rotate about the ends of the connecting links but are of such diameter as to clear each other when the chain is extended thus avoiding the friction between the reinforcing members themselves.

In practice the cross chains are used without reversing until a corner such as 14 of the curb chain links begins to show appreciable wear. It is then the plan to reverse the cross chains end for end so that the opposite corner 15 may now take the wear. This reversing of the chain end for end will also reverse the wear on the reinforcing members 12. As will be seen from Fig. 3 the side 16 of the link 12 is worn to some extent in the first position but in the second position the bevel of wear will be on the opposite side of the rings and when the cross chain is turned upside down, first one side of the rings will be given an additional wear and then when turned end for end the other side will be given additional wear, the rings being made of such size that when worn on their two sides they will still have sufficient body to allow for wear during the third and forth reversal of the chain, in other words the rings are preferably of such cross section and hardness as to outwear the curb links.

What I claim is:—

1. In a tire cross chain, two connecting members, a plurality of links connecting said members and a plurality of wear-shearing circular links, each embracing a plurality of said connecting links.

2. In a tire chain, two connecting members, a plurality of welded curb chain links connecting said members and a plurality of non-welded circular links each loosely surrounding the proximate ends of adjacent curb chain links, the internal diameter of said circular links being less than the length of either of the curb links surrounded by the circular non-welded link.

3. In a tire chain, a plurality of welded curb chain links and a plurality of additional links of high carbon steel each surrounding the proximate ends of two adjacent connecting welded curb chain links, the internal dimension of said additional links being less than the length of either of the surrounded links.

4. In an anti-skidding device, a tread member comprising a series of inter-connected chain links, and a reinforcing ring enclosing the strands at the junction of a pair of adjacent links.

JOHN SENFT.